(12) United States Patent
Jung et al.

(10) Patent No.: US 9,097,855 B2
(45) Date of Patent: Aug. 4, 2015

(54) ADHESIVE, POLARIZING PLATE INCLUDING AN ADHESIVE LAYER PREPARED FROM THE ADHESIVE, AND OPTICAL MEMBER INCLUDING THE POLARIZING PLATE

(71) Applicants: Ri Ra Jung, Uiwang-si (KR); Yi Eun Kim, Uiwang-si (KR)

(72) Inventors: Ri Ra Jung, Uiwang-si (KR); Yi Eun Kim, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 252 days.

(21) Appl. No.: 13/729,731

(22) Filed: Dec. 28, 2012

(65) Prior Publication Data

US 2013/0170035 A1 Jul. 4, 2013

(30) Foreign Application Priority Data

Dec. 29, 2011 (KR) .................. 10-2011-0146567

(51) Int. Cl.
*G02B 5/30* (2006.01)
*C09J 7/02* (2006.01)
*C09J 133/06* (2006.01)

(52) U.S. Cl.
CPC ............... *G02B 5/30* (2013.01); *C09J 7/0239* (2013.01); *C09J 133/06* (2013.01); *G02B 5/3025* (2013.01); *Y10T 428/2891* (2015.01)

(58) Field of Classification Search
CPC ....... G02B 5/30; G02B 5/3025; C09J 7/0239; C09J 133/06; Y10T 428/2891
USPC .................................. 359/483.01, 492.01
See application file for complete search history.

(56) References Cited

U.S. PATENT DOCUMENTS 8,679,931 B2 * 3/2014 Asai et al. .................. 438/354
2014/0037923 A1 * 2/2014 Asai et al. .................. 428/212

FOREIGN PATENT DOCUMENTS

CN 102816545 A 12/2012
WO WO-2010/002195 A2 1/2010

OTHER PUBLICATIONS

Office Action mailed Jul. 23, 2014 in corresponding Chinese Patent Application No. 201210589649.2.

* cited by examiner

*Primary Examiner* — Frank Font
(74) *Attorney, Agent, or Firm* — Lee & Morse, P.C.

(57) ABSTRACT

An adhesive for adhering a protective film, the protective film having a water vapor transmission rate of about 100 g/m$^2$·day or less at 40° C. and about 90% RH during manufacture of an optical member including a polarizing plate, a polarizing plate including an adhesive layer prepared from the adhesive, and an optical member including the polarizing plate, the adhesive including a (meth)acrylic copolymer, the (meth)acrylic copolymer having a weight average molecular weight of about 800,000 g/mol or more; a curing agent; and a silane coupling agent, wherein an adhesive layer prepared from the adhesive has a storage modulus, after curing, of about 8×10$^3$ Pa or more at about 85° C. and a frequency of about 10$^{-3}$ rad/s to about 10$^2$ rad/s.

16 Claims, 1 Drawing Sheet

ADHESIVE, POLARIZING PLATE INCLUDING AN ADHESIVE LAYER PREPARED FROM THE ADHESIVE, AND OPTICAL MEMBER INCLUDING THE POLARIZING PLATE

CROSS-REFERENCE TO RELATED APPLICATION

The present application claims priority under 35 U.S.C. §119 to Korean Patent Application No. 10-2011-0146567 filed on Dec. 29, 2011, in the Korean Intellectual Property Office, and entitled: "ADHESIVE FOR POLARIZING PLATE, POLARIZING PLATE COMPRISING ADHESIVE LAYER INCLUDING THE SAME AND OPTICAL MEMBER COMPRISING THE SAME," which is incorporated by reference herein in its entirety.

BACKGROUND

1. Field

Embodiments relate to an adhesive, a polarizing plate including an adhesive layer prepared from the adhesive, and an optical member including the polarizing plate.

2. Description of the Related Art

Polarizing plates may be placed on both sides of a liquid crystal cell to control a direction of light in order to visualize a display pattern of a liquid crystal display. Applications of liquid crystal displays have been continuously widened from small devices of an initial stage to notebook computers, LCD monitors, color LCD projectors, LCD televisions, car navigation systems, personal phones, outdoor/indoor measurement instruments, or the like.

A polarizing plate may include a polarizer and a protective film attached to both sides of the polarizer. The protective film may include, e.g., a triacetylcellulose (TAC) film. However, films other than a TAC film (as a protective film for a polarizing plate) may be used, due to cost and/or optical properties of TAC.

SUMMARY

Embodiments are directed to an adhesive, a polarizing plate including an adhesive layer prepared from the adhesive, and an optical member including the polarizing plate.

The embodiments may be realized by providing an adhesive for adhering a protective film, the protective film having a water vapor transmission rate of about 100 g/m$^2$·day or less at 40° C. and about 90% RH during manufacture of an optical member including a polarizing plate, the adhesive including a (meth)acrylic copolymer, the (meth)acrylic copolymer having a weight average molecular weight of about 800,000 g/mol or more; a curing agent; and a silane coupling agent, wherein an adhesive layer prepared from the adhesive has a storage modulus, after curing, of about 8×10$^3$ Pa or more, at about 85° C. and a frequency of about 10$^{-3}$ rad/s to about 10$^2$ rad/s.

The adhesive layer prepared from the adhesive may have a storage modulus, after curing, of about 27×10$^3$ Pa to about 2×10$^5$ Pa, at about 85° C. and a frequency of about 10$^{-3}$ rad/s to about 10$^2$ rad/s.

The adhesive may be for adhering to a protective film that includes one selected from the group of cyclic polyolefin, polycarbonate, polyester, polyethersulfone, polysulfone, polyamide, polyimide, polyolefin, polyarylate, polyvinyl alcohol, polyvinyl chloride, polyvinylidene chloride films, and mixtures thereof.

The (meth)acrylic copolymer may have a weight average molecular weight of about 800,000 g/mol to about 1,800,000 g/mol.

The (meth)acrylic copolymer may have a glass transition temperature of less than about −29° C.

The (meth)acrylic copolymer may be a copolymer of a hydroxyl group-containing (meth)acrylic monomer, an alkyl group-containing (meth)acrylic monomer, and a carboxylic acid group-containing (meth)acrylic monomer.

The curing agent may be selected from the group of an isocyanate curing agent, a carbodiimide curing agent, an epoxy curing agent, an aziridine curing agent, a melamine curing agent, an amine curing agent, an imide curing agent, an amide curing agent, and mixtures thereof.

The curing agent may include a mixture of an isocyanate curing agent and a carbodiimide curing agent in a weight ratio of about 2:1 to 30:1.

The curing agent may be present in the adhesive in an amount of about 0.5 parts by weight to about 5 parts by weight, based on 100 parts by weight of the (meth)acrylic copolymer.

The silane coupling agent may include an epoxy group.

The silane coupling agent may be present in the adhesive in an amount of about 0.01 parts by weight to about 5 parts by weight, based on 100 parts by weight of the (meth)acrylic copolymer.

The embodiments may also be realized by providing a polarizing plate including an adhesive layer prepared from the adhesive according to an embodiment.

The polarizing plate may further include a protective film having a water vapor transmission rate of about 100 g/m$^2$·day or less at 40° C. and about 90% RH.

The polarizing plate may further include a polarizer; a first protective film stacked on an upper side of the polarizer; and a second protective film stacked on a lower side of the polarizer, the second protective film having a water vapor transmission rate of about 100 g/m$^2$·day or less at about 40° C. and about 90% RH, and being between the adhesive layer and the polarizer.

The polarizing plate may further include a polarizer; a first protective film stacked on an upper side of the polarizer; a second protective film stacked on a lower side of the polarizer; and a third protective film stacked on a lower side of the second protective film, wherein at least one of the second protective film and the third protective film has a water vapor transmission rate of about 100 g/m$^2$·day or less at about 40° C. and about 90% RH, and the adhesive layer includes a first adhesive layer and a second adhesive layer, the first adhesive layer being between the second protective film and the third protective film and the third protective film being between the second adhesive layer and the first adhesive layer.

The embodiments may also be realized by providing an optical member including the polarizing plate according to an embodiment.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
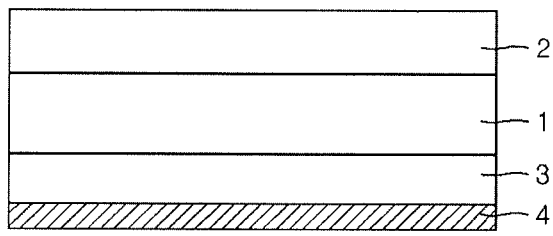
FIG. 1 illustrates a cross-sectional view of a polarizing plate according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

An adhesive for a polarizing plate according to an embodiment may be used to prepare an adhesive layer having a storage modulus, after curing, of about $8 \times 10^3$ Pa or more, when measured at about 85° C. and a frequency of about $10^{-3}$ to about $10^2$ rad/s.

A polarizing plate may be used by attaching a protective film (having a water vapor transmission rate of about 100 g/m²·day or less at about 40° C. and about 90% RH), e.g., to an LCD panel and/or another protective film, with an adhesive that forms an adhesive layer having a storage modulus less than about $8 \times 10^3$ Pa. However, microbubbles may be generated when the polarizing plate (including the adhesive layer thereon) prepared as such is left at high temperatures, thereby providing an undesirable appearance of the polarizing plate. Further, in the case of using an adhesive for polarizing plates, the storage modulus of which may be much lower than about $8 \times 10^3$ Pa, the polarizing plate may be further deteriorated in durability.

The adhesive for a polarizing plate according to an embodiment may be used to prepare and adhesive layer having, after curing, a storage modulus of about $27 \times 10^3$ Pa or more, e.g., about $27 \times 10^3$ Pa to about $2 \times 10^6$ Pa, about $27 \times 10^3$ Pa to about $2 \times 10^5$ Pa, or about $27 \times 10^3$ Pa to about $55 \times 10^3$ Pa.

The storage modulus may be measured by a suitable method. For example, samples may be prepared by laminating and curing an adhesive to a thickness of about 70 μm or more, e.g., about 70 μm to 1 mm, to form an adhesive layer or sheet, and cutting the adhesive sheet into a circular sample having a diameter of 8 mm. Frequency sweep testing may be carried out by oscillation at 85° C. and a frequency of about $10^{-3}$ rad/s to about $10^2$ rad/s using MCR-501 (Physica Co., Ltd). A minimum storage modulus (G') may be obtained.

In an implementation, to measure the storage modulus, the adhesive for polarizing plates may be cured by being left under the condition of about 35° C. and about 45% RH for three days.

As noted above, the protective film for polarizing plates may include cellulose films such as triacetyl cellulose (TAC) and diacetyl cellulose. Such cellulose films may have a high water vapor transmission rate (which may correspond to a transmission rate of other types of vapors, e.g., volatile organic vapors). As a result, even when polarizing plates are left at high temperatures for a long period of time, volatile organic compounds remaining inside the adhesive layer may readily escape from the polarizing plate through the protective film upon evaporation thereof. Accordingly, the generation of microbubbles therein may be reduced and/or prevented, thereby substantially preventing a deterioration in appearance and durability.

Due to optical properties and/or cost of TAC, non-cellulose (e.g., non-tricacetyl cellulose (TAC)) films may be used as protective films for polarizing plates. However, the non-cellulose films may have a very low water vapor transmission rate of, e.g., about 0.3 g/m²·day to about 100 g/m²·day, as compared with the higher water vapor transmission rate of cellulose films. As a result, if polarizing plates are left at high temperatures for a long period of time, volatile organic compounds remaining inside of the adhesive layer may not escape from the polarizing plate through the protective film. Thus, microbubbles may be generated inside the polarizing plate, thereby causing a deterioration in appearance and durability of the polarizing plate.

The adhesive for polarizing plates according to an embodiment may be used for adhesion of protective films that have a water vapor transmission rate (WVTR) of about 100 g/m²·day or less at about 40° C. and about 90% RH. Even in the case where the adhesive for polarizing plates according to an embodiment is applied to a protective film having a very low water vapor transmission rate, microbubbles may not be generated when the polarizing plate including the adhesive layer thereon is left at high temperatures, thereby ensuring excellent durability.

The adhesive for polarizing plates according to an embodiment may be used to attach a protective film (having a water vapor transmission rate of about 100 g/m²·day or less) to a liquid crystal display panel, or to attach protective films (e.g., having a water vapor transmission rate of about 100 g/m²·day or less, or another water vapor transmission rate) with each other.

The protective film (to which the adhesive for polarizing plates according to an embodiment may be attached) may have a water vapor transmission rate of about 100 g/m²·day or less at about 40° C. and about 90% RH. In an implementation, the protective film may have a water vapor transmission rate of about 0.5 g/m²·day to 70 g/m²·day, e.g., about 0.5 g/m²·day to 10 g/m²·day or about 0.3 g/m²·day to 3 g/m²·day. The water vapor transmission rate may be measured in a thickness direction of a protective film. F or example, the water vapor transmission rate may be measured using cup for measuring humidity (humidity cup). For example, the protective film is cut to circular form with diameter 10 cm. 3 g of $CaCl_2$ is loaded in the glass plate which is included in the humidity cup. In the humidity cup, the cut protective film is loaded. Put the protective film to the humidity cup and keep the balance with the ring in the middle of the humidity cup. Put the pendulum on the ring and remove the guide. After removing the guide, put the paraffin to seal the gap between the ring and humidity cup. When the paraffin is harden, measure the weight of the humidity cup including the protective film (a, unit:g) with removing the pendulum. Then, the humidity cup is put in the constant temperature and humidity of 40° C. and 90% RH for 24 hours. Then, the weight of the humidity cup including the protective film (b, unit:g) is measured. Area for humidity means total surface area of the humidity cup(c, unit:m²). The water vapor transmission rate may be measured from (b−a)/c.

Examples of protective films may include films of cyclic polyolefins (including amorphous cyclic olefin polymer (COP)), polyesters (including poly(meth)acrylates and polyethylene terephthalate(PET)), polycarbonates, polyethersulfone, polysulfone, polyamide, polyimide, polyolefin, polyarylate, polyvinyl alcohol, polyvinyl chloride, polyvinylidene chloride, and mixtures thereof.

In an implementation, cyclic polyolefins, polycarbonates, poly(meth)acrylates, and/or polyesters may be used for the protective film.

In an implementation, the protective film may have a thickness of, e.g., about 10 μm to 200 μm or about 20 μm to 120 μm.

The adhesive for polarizing plates according to an embodiment may include, e.g., a (meth)acrylic copolymer, a curing agent, and a silane coupling agent.

The (meth)acrylic copolymer may have a weight average molecular weight of about 800,000 g/mol or more. Maintaining the weight average molecular weight of the (meth)acrylic copolymer at about 800,000 g/mol or more may help ensure that an adhesive layer prepared from the adhesive will have a sufficiently high storage modulus. Thus, generation of microbubbles upon exposure to high temperature may be reduced and/or prevented, when a polarizing plate is fabricated by adhering a protective film (having a water vapor transmission rate of about 100 g/m²·day or less), thereby substantially preventing a deterioration in appearance and durability of the polarizing plate. In an implementation, the (meth)acrylic copolymer may have a weight average molecular weight of about 800,000 g/mol to about 1,800,000 g/mol, e.g., about 900,000 g/mol to about 1,600,000 g/mol.

The (meth)acrylic copolymer may have a glass transition temperature of less than about −29° C. Within this range, even if a polarizing plate including a protective film (having a water vapor transmission rate of about 100 g/m²·day or less) with an adhesive layer thereon is exposed to high temperatures, microbubbles may not be generated, and the polarizing plate may exhibit excellent durability. In an implementation, the (meth)acrylic copolymer may have a glass transition temperature of about −40° C. to about −30° C., e.g., about −38° C. to about −31° C.

The (meth)acrylic copolymer may be a copolymer of at least one selected from the group of a hydroxyl group-containing (meth)acrylic monomer, an alkyl group-containing (meth)acrylic monomer, and a carboxylic acid group-containing (meth)acrylic monomer.

The hydroxyl group-containing (meth)acrylic monomer may be a C2~C20 alkyl group or C5~C20 cycloalkyl group containing a (meth)acrylate ester, which has a hydroxyl group at a terminal end or in the molecular structure. For example, the hydroxyl group-containing (meth)acrylic monomer may include at least one selected from the group of 2-hydroxyethyl (meth)acrylate, 2-hydroxypropyl(meth)acrylate, 2-hydroxybutyl(meth)acrylate, 4-hydroxybutyl(meth)acrylate, 6-hydroxyhexyl(meth)acrylate, 1,4-cyclohexanedimethanol mono(meth)acrylate, 1-chloro-2-hydroxypropyl(meth)acrylate, diethylene glycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)acrylate, 2-hydroxy-3-phenyloxypropyl(meth)acrylate, 4-hydroxycyclopenty(meth)acrylate, 4-hydroxycyclohexyl(meth)acrylate, and cyclohexanedimethanol mono(meth)acrylate.

Repeating units of the hydroxyl group-containing (meth)acrylic monomer may be present in the (meth)acrylic copolymer in an amount of about 0.1 wt % to about 10 wt %, e.g., about 0.5 wt % to about 2 wt %. Within this range, the adhesive may have improved adhesive strength.

The alkyl group-containing (meth)acrylic monomer may include a (meth)acrylate ester having an acyclic, straight or branched C1~C20 alkyl group. For example, the alkyl group containing (meth)acrylic monomer may include may be at least one selected from the group of methyl(meth)acrylate, ethyl(meth)acrylate, propyl(meth)acrylate, n-butyl(meth)acrylate, t-butyl(meth)acrylate, iso-butyl(meth)acrylate, pentyl(meth)acrylate, hexyl(meth)acrylate, 2-ethylhexyl(meth)acrylate, heptyl(meth)acrylate, octyl(meth)acrylate, iso-octyl(meth)acrylate, nonyl(meth)acrylate, decyl(meth)acrylate, and lauryl(meth)acrylate.

Repeating units of the alkyl group containing (meth)acrylic monomer may be present in the (meth)acrylic copolymer in an amount of about 84 wt % to about 99.9 wt %, e.g., about 84 wt % to about 99.8 wt % or about 85 wt % to about 95 wt %.

The carboxylic acid group-containing (meth)acrylic monomer may be a C1~C10 (meth)acrylate ester having at least one carboxylic acid at a terminal end or in the molecular structure, or a carboxylic acid having a (meth)acrylic group. For example, The carboxylic acid group-containing (meth)acrylic monomer may be at least one selected from the group of (meth)acrylic acid and β-carboxyethyl(meth)acrylate.

Repeating units of the carboxylic acid group-containing (meth)acrylic monomer may be present in the (meth)acrylic copolymer in an amount of about 0 wt % to about 6 wt %, greater than 0 wt % to about 6 wt %, e.g., about 0.1 wt % to about 6 wt % or about 1 wt % to about 4 wt %. Within this range, the adhesive may have improved adhesive strength.

The (meth)acrylic copolymer may further include repeating units of an aromatic group-containing vinyl monomer, an alicyclic group-containing vinyl monomer, a pyrolidonyl group-containing vinyl monomer, N-substituted maleimide, a furyl group-containing vinyl monomer, or mixtures thereof.

The aromatic group-containing vinyl monomer may be a vinyl monomer having positive birefringence. In an implementation, the aromatic group-containing vinyl monomer may be represented by Formula 1, below.

[Formula 1]

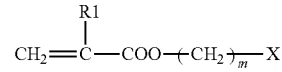

In Formula 1, R1 may be hydrogen or a C1-C5 alkyl group; m may be an integer ranging from 0 to 10; and X may be selected from the group of a phenyl group, a methylphenyl group, a methylethylphenyl group, a methoxyphenyl group, a propylphenyl group, a cyclohexylphenyl group, a chlorophenyl group, a bromophenyl group, a phenylphenyl group, a benzyl group, and a benzylphenyl group.

In an implementation, the aromatic group-containing vinyl monomer may be represented by Formula 2, below.

[Formula 2]

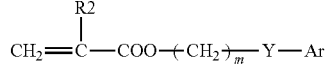

In Formula 2, R2 may be hydrogen or a C1-C5 alkyl group; m may be an integer ranging from 0 to 10; Y may be oxygen or sulfur; and Ar may be selected from the group of a phenyl group, a methylphenyl group, a methylethylphenyl group, a methoxyphenyl group, a propylphenyl group, a cyclohexylphenyl group, a chlorophenyl group, a bromophenyl group, a phenylphenyl group, a benzyl group, and a benzylphenyl group.

For example, the aromatic group containing vinyl monomer represented by

Formula 1 or 2 may include at least one selected from the group of phenoxy(meth)acrylate, 2-ethylphenoxy(meth)acrylate, benzyl(meth)acrylate, phenyl(meth)acrylate, 2-ethylthiophenyl(meth)acrylate, 2-phenylethyl(meth)acrylate, 3-phenylpropyl(meth)acrylate, 4-phenylbutyl(meth)acrylate, 2-2-methylphenylethyl(meth)acrylate, 2-3-methylphenylethyl(meth)acrylate, 2-4-methylphenylethyl(meth)acrylate, 2-(4-propylphenyl)ethyl(meth)acrylate, 2-(4-(1-methylethyl)phenyl)ethyl(meth)acrylate, 2-(4-methoxyphenyl)ethyl(meth)acrylate, 2-(4-cyclohexylphenyl)ethyl(meth)acrylate, 2-(2-chlorophenyl)ethyl(meth)acrylate, 2-(3-chlorophenyl)ethyl(meth)acrylate, 2-(4-chlorophenyl)ethyl(meth)acrylate, 2-(4-bromophenyl)ethyl(meth)acrylate, 2-(3-phenylphenyl)ethyl methacrylate, and 2-(4-benzylphenyl)ethyl methacrylate.

In an implementation, the aromatic group-containing vinyl monomer may be, e.g., phenoxydiethylene glycol(meth)acrylate, ethylene oxide modified nonylphenol (meth)acrylate, biphenyl(meth)acrylate, styrene, vinyl toluene, alpha-methylstyrene, or hydroxyethylated beta-naphthol(meth)acrylate.

The alicyclic group-containing vinyl monomer may include, e.g., a (meth)acrylate ester or (meth)acrylic monomer containing a monocyclic or heterocyclic C4~C20 alicyclic ring. For example, the alicyclic group-containing vinyl monomer may include cyclopentyl(meth)acrylate, cyclohexyl(meth)acrylate, or isobornyl(meth)acrylate.

The pyrolidonyl group-containing vinyl monomer may include, e.g., N-vinylpyrolidone.

The furyl group-containing vinyl monomer may include, e.g., vinyl monomers having a furyl group including furyl(meth)acrylate or tetrahydroferfuryl(meth)acrylate, furyl isocyanate, furyl propionate, or furyl pentanoate.

The N-substituted maleimide may be, e.g., a maleimide in which an N atom in a maleimide is substituted with a C1~C5 alkyl group, a C6~C10 aryl group, or a C5~C10 cycloalkyl group.

Repeating units of the aromatic group-containing vinyl monomer, alicyclic group-containing vinyl monomer, pyrolidonyl group-containing vinyl monomer, N-substituted maleimide, monomers having a furyl group, or mixtures thereof may be present in the (meth)acrylic copolymer in an amount of about 0 wt % to about 30 wt %, e.g., about 0 wt % to about 15 wt % or about 0.1 wt % to about 14 wt %.

In an implementation, the (meth)acrylic copolymer may be a polymer of butyl(meth)acrylate, methyl(meth)acrylate, 2-hydroxyethyl(meth)acrylate, and (meth)acrylic acid.

The (meth)acrylic copolymer may be prepared by a suitable copolymer preparation process. For example, the (meth)acrylic copolymer may be prepared by adding a polymerization initiator into a mixture of the monomers. The polymerization initiator may include, e.g., at least one or two compounds selected from the group of 2,2-azobis(2,4-dimethylvaleronitrile), azobisisobutyronitrile, benzoyl peroxide, dilauroyl peroxide, tert-butyl-(2-ethylhexyl)monoperoxycarbonate, tert-amyl-(2-ethylhexyl)monoperoxycarbonate, 1,1-di(tert-butylperoxy)cyclohexane, 1,1-di(tert-amylperoxy)cyclohexane, tert-butylperoxy-3,5,5-trimethylhexanoate, 1,1-di(tert-butylperoxy)-3,3,5-trimethylcyclohexane, potassium persulfate, sodium persulfate, ammonium persulfate, and azo-based water soluble initiators. The initiator may be present in an amount of about 0.001 to about 2 parts by weight, based on 100 parts by weight of the alkyl group containing (meth)acrylic monomer.

The (meth)acrylic copolymer may be prepared by a suitable method, e.g., suspension polymerization and/or emulsion polymerization. The temperature and time for polymerization may be suitably adjusted.

The curing agent may be present in the adhesive in an amount of about 0.5 to about 5 parts by weight, e.g., about 0.5 to about 4.7 parts by weight, based on 100 parts by weight of the (meth)acrylic copolymer. Within this range, the adhesive layer prepared from the adhesive may have a high enough storage modulus to help ensure that the polarizing plate (fabricated by adhering a protective film having a water vapor transmission rate of about 100 g/m²·day or less) does not generate microbubbles upon exposure to high temperatures, thereby substantially preventing deterioration of the appearance. In addition, a degree of crosslinking of the adhesive layer may not be excessive, thereby reducing and/or preventing occurrence of strain and/or stress upon applying the adhesive layer to a protective film of a polarizing plate.

The curing agent may include one selected from the group of an isocyanate curing agent, a carbodiimide curing agent, an epoxy curing agent, an aziridine curing agent, a melamine curing agent, an amine curing agent, an imide curing agent, an amide curing agent, and mixtures thereof. In an implementation, the curing agent may include an isocyanate curing agent alone.

In an implementation, a mixture of an isocyanate curing agent and a carbodiimide curing agent may be used as the curing agent. A weight ratio of the isocyanate curing agent to the carbodiimide curing agent may be, e.g., about 2:1 to about 30:1 or about 3:1 to about 29:1.

The isocyanate curing agent may include a suitable isocyanate curing agent. For example, the isocyante curing agent may include at least one selected from the group of 2,4-trilenediisocyanate, 2,6-trilenediisocyanate, hydrogenated trilene diisocyanate, 1,3-xylene diisocyanate, 1,4-xylene diisocyanate, diphenylmethane-4,4-diisocyanate, 1,3-bisisocyanatomethyl cyclohexane, tetramethylxylene diisocyanate, 1,5-naphthalene diisocyanate, 2,2,4-trimethylhexamethylene diisocyanate, 2,4,4-trimethylhexamethylene diisocyanate, an adduct of trilene diisocyanate with trimethylolpropane, an adduct of xylene diisocyanate with trimethylolpropane, triphenylmethanetriisocyanate, and methylenebistriisocyanate.

The carbodiimide curing agent may include a suitable carbodiimide curing agent.

For example, the carbodiimide curing agent may include the structure of —(—N=C=N—)—. In an implementation, the carbodiimide curing agent may have a structure represented by one of the following Formulae 3a to 3o.

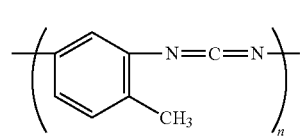

[Formula 3a]

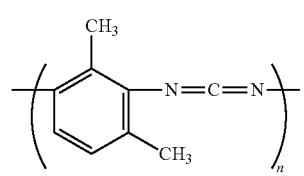

[Formula 3b]

-continued

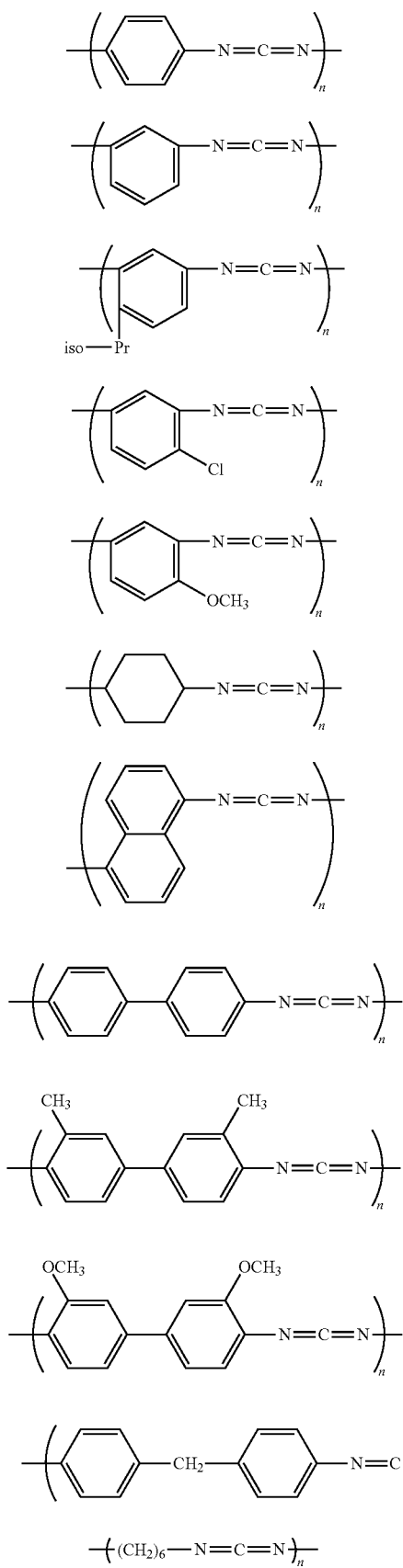

[Formula 3c]
[Formula 3d]
[Formula 3e]
[Formula 3f]
[Formula 3g]
[Formula 3h]
[Formula 3i]
[Formula 3j]
[Formula 3k]
[Formula 3l]
[Formula 3m]
[Formula 3n]

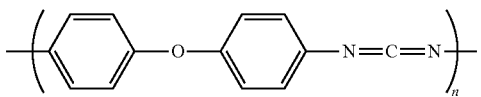

[Formula 3o]

In Formulae 3a to 3o, n may be an integer ranging from about 5 to about 100.

The carbodiimide curing agent may have a weight average molecular weight of about 1,000 g/mol to about 5,000 g/mol. Within this range, the curing agent may help ensure a proper reaction rate and may help enhance liquid stability and a curing reaction with the copolymer.

The silane coupling agent may be present in the adhesive in an amount of about 0.01 to about 5 parts by weight, based on 100 parts by weight of the (meth)acrylic copolymer. Within this range, the adhesive may exhibit excellent adhesion with respect to a liquid crystal panel and may help ensure good storage stability of the (meth)acrylic copolymer. In an implementation, the silane coupling agent may be present in an amount of about 0.01 to about 1 part by weight, e.g., about 0.01 to about 0.5 parts by weight.

The silane coupling agent may include a suitable silane coupling agent. For example, the silane coupling agent may include at least one selected from the group of silicon compounds having an epoxy structure such as 3-glycidoxypropyltrimethoxysilane, 3-glycidoxypropyltriethoxysilane, 3-glycidoxypropylmethyl dimethoxysilane, 2-(3,4-epoxycyclohexyl)ethyltrimethoxysilane, and the like; polymerizable unsaturated groups containing silicon compounds such as vinyl trimethoxy silane, vinyl triethoxy silane, (meth)acryloxypropyl trimethoxysilane, and the like; amino group containing silicon compounds such as 3-aminopropyl trimethoxysilane, N-(2-aminoethyl)-3-aminopropyl trimethoxysilane, N-(2-aminoethyl)-3-aminopropyl methyl dimethoxysilane, and the like; and 3-chloropropyl trimethoxysilane, and the like. In an implementation, the silane coupling agent may have an epoxy structure, e.g., may include an epoxy group.

The adhesive for polarizing plates may further include a solvent. In an implementation, the solvent may include, e.g., methylethylketone or the like.

Another embodiment provides a polarizing plate that includes an adhesive layer prepared from the adhesive for polarizing plates as described above.

For example, the polarizing plate may include the adhesive layer and a protective film (having a water vapor transmission rate of about 100 $g/m^2 \cdot day$ or less at about 40° C. and about 90% RH).

The protective film having a water vapor transmission rate of about 100 $g/m^2 \cdot day$ or less at about 40° C. and about 90% RH may be the same as described above. The protective film may be stacked on and/or adhered to a liquid crystal display panel via the adhesive layer, or it may be stacked on and/or adhered to another protective film having a water vapor transmission rate of about 100 $g/m^2 \cdot day$ or less or more than 100 $g/m^2 \cdot day$ at about 40° C. and about 90% RH.

The adhesive layer may be formed by drying the adhesive for polarizing plates. In an implementation, the adhesive layer may be left under a condition of about 35° C. and about 45% RH for three days to be cured.

The adhesive layer may have a thickness (after drying) of about 5 μm to about 100 μm. In an implementation, drying may be performed, e.g., at about 90° C. for about 4 minutes.

The polarizing plate may include a polarizer and a protective film laminated on both sides of the polarizer.

The polarizer may be formed of a polyvinyl alcohol film, and may be prepared by a suitable method such that the polarizer is formed of the polyvinyl alcohol film. For example, the polarizer may be prepared using a partially formalized or cured polyvinyl alcohol film, a modified polyvinyl alcohol film, such as an acetoacetyl-modified polyvinyl alcohol film, and the like The polyvinyl alcohol film may have a degree of polymerization of about 1,500 to about 4,000. Within this range, the polyvinyl alcohol film may be used as a polarization material and may provide satisfactory optical characteristics when applied to a polarizing film.

The polarizer may be manufactured by dyeing the polyvinyl alcohol film with iodine or dichroic dyes, followed by stretching the dyed polyvinyl alcohol film in a certain direction. For example, the polarizer may be manufactured by swelling, dyeing, and stretching. In an implementation, the polarizer may have a thickness of, e.g., about 10 μm to about 50 μm.

The details of the protective film are as set forth above. In an implementation, the protective film may have a thickness of about 10 μm to about 200 μm, e.g., about 30 μm to about 120 μm.

FIG. 1 illustrates a polarizing plate according to an embodiment. Referring to FIG. 1, the polarizing plate may include a polarizer 1; a first protective film 2 stacked on an upper side of the polarizer 1; and a second protective film 3 stacked on a lower side of the polarizer 1 (to be placed on and/or adhered to a liquid crystal display panel (not shown)). The second protective film 3 may have a water vapor transmission rate of about 100 g/m$^2$·day or less at about 40° C. and about 90% RH. The second protective film 3 may be stacked on the liquid crystal display panel and/or adhered to the liquid crystal display panel via the adhesive layer 4.

Figure 2:
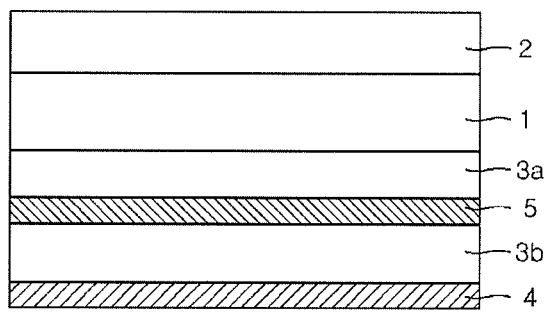
FIG. 2 illustrates a cross-sectional view of a polarizing plate according to an embodiment.

FIG. 2 illustrates a polarizing plate according to an embodiment. Referring to FIG. 2, the polarizing plate may include a polarizer 1; a first protective film 2 stacked on an upper side of the polarizer 1; a second protective film 3a stacked on a lower side of the polarizer 1; and a third protective film 3b stacked on a lower side of the second protective film 3a (the third protective film 3b to be placed on and/or adhered to a liquid crystal display panel (not shown)). At least one of the second protective film 3a and the third protective film 3b may have a water vapor transmission rate of about 100 g/m$^2$·day or less at about 40° C. and about 90% RH. The third protective film 3b may be disposed between the second protective film 3a and the liquid crystal display panel via adhesive layers 4, 5. For example, one adhesive layer 5 may be between the second protective film 3a and the third protective film 3b, and another adhesive layer 4 may be between the third protective film 3b and the LCD panel (not illustrated). At least one of the adhesive layers 4, 5 may be the adhesive for polarizing plates according to an embodiment.

Another embodiment provides an optical member including the polarizing plate. For example, the optical member may include a liquid crystal display which may include a front polarizing plate on a front side of the liquid crystal display panel, a rear polarizing plate on a rear side of the liquid crystal display panel, e.g., between a backlight unit and the liquid crystal display panel, or both thereof.

Figure 3:
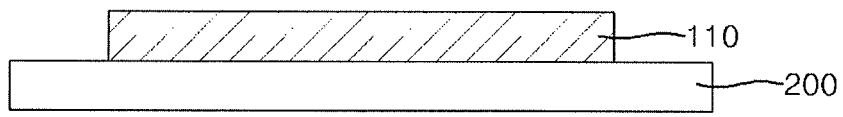
FIG. 3 illustrates a cross-sectional view of an optical member according to an embodiment.

FIG. 3 illustrates a cross-sectional view of an optical member according to an embodiment. Referring to FIG. 3, the optical member may include a liquid crystal panel 200; and a polarizing plate 110 on an upper side of the liquid crystal panel 200.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Details of components used in Examples and Comparative Examples are as follows.

(A) (Meth)acrylic copolymer (A1) CI-203 (Soken, Mw: 1,600,000 g/mol, Tg: −33° C.)

(A2) X-310-750S (Saiden, Mw: 900,000 g/mol, Tg: −31° C.)

(A3) CI-329 (Soken, Mw: 900,000 g/mol, Tg: −38° C.)

(A4) 269 (Cheil Industries Co., Ltd., Mw: 400,000 g/mol, Tg: −29° C.)

(B) Curing agent (B1) Trimethylolpropane adduct of diisocyanate Coronate L (Nippon Polyurethane Industry, Japan) as an isocyanate curing agent (B2) Carbodiimide curing agent V05S (Nisshinbo Chemical Inc.)

(C) Silane coupling agent 3-glycidoxypropyltrimethoxy silane (KBM-403, Shinetsu Chemical Co., Ltd.)

EXAMPLE 1

To 20 parts by weight of methylethylketone, 100 parts by weight of a (meth)acrylic copolymer (A1), 0.5 parts by weight of a curing agent (B1) and 0.16 parts by weight of a curing agent (B2) were added and stirred at 25° C. for 5 minutes. To the mixture, 0.35 parts by weight of a silane coupling agent (C) was added and stirred at 25° C. for 5 minutes to prepare an adhesive for polarizing plates.

EXAMPLE 2 TO 6 AND COMPARATIVE EXAMPLE 1

Adhesives for polarizing plates were prepared in the same manner as in Example 1 except that the kind of (meth)acrylic copolymer and the content of curing agent were changed as listed in Table 1, below. (unit: parts by weight, in terms of solid content)

TABLE 1

|   |   | Examples | | | | | | Comparative |
|---|---|---|---|---|---|---|---|---|
|   |   | 1 | 2 | 3 | 4 | 5 | 6 | Example 1 |
| (A) | (A1) | 100 | 100 | 100 | — | — | — | — |
|   | (A2) | — | — | — | 100 | 100 | — | — |
|   | (A3) | — | — | — | — | — | 100 | — |
|   | (A4) | — | — | — | — | — | — | 100 |

TABLE 1-continued

|   |      | Examples |      |      |     |      |     | Comparative Example 1 |
|---|------|------|------|------|-----|------|-----|------|
|   |      | 1    | 2    | 3    | 4   | 5    | 6   |      |
| (B) | (B1) | 0.5  | 1.6  | 1.87 | 0.8 | 3.25 | 4.5 | 1.87 |
|   | (B2) | 0.16 | 0.16 | 0.16 | 0.16 | —   | 0.16 | 0.16 |
| (C) |      | 0.35 | 0.35 | 0.35 | 0.35 | 0.35 | 0.35 | 0.35 |

The adhesives for polarizing plates prepared in the Examples and the Comparative Example were tested as to physical properties described below. Results are summarized in Table 2, below.

(1) Storage modulus (Pa): Each prepared adhesive for polarizing plates was applied to a polyethylene terephthalate release film and dried at 90° C. for 4 minutes to prepare a 20 μm thick adhesive layer. The adhesive layer was left at 35° C. and 45% RH for 3 days. The cured adhesive layers were stacked to form a 1 mm thick adhesive sheet, which was then cut into a circular specimen having a diameter of 8 mm. Storage modulus of the specimen was measured using a storage modulus tester (MCR-501, Physica Company Ltd.) through a frequency sweep test at 85° C. and a frequency of about $10^{-3}$ rad/s to about $10^2$ rad/s. The minimum value was calculated.

(2) Occurrence of microbubbles at high temperature: A polarizing plate was prepared using the adhesive. The polarizing plate was prepared by applying the adhesive to a polarizing film including a COP protective film (having a water vapor transmission rate of 2 g/m²·day at 40° C. and 90% RH, thickness: 33 μm, ZEONOR, Zeon Corporation). The prepared polarizing plate was cut into a size of 10 cm×8 cm. The cut polarized plate was adhered to a liquid crystal display or a glass plate, followed by pressing at 50° C. and 3.5 atm. The liquid crystal display or glass plate having the polarizing plate adhered thereto was left at 85° C. for 250 hours as a dry heat condition and then at 25° C. for 1 hour or more. The polarizing plate was observed with the naked eye or through an optical microscope to identify whether microbubbles occurred inside the polarizing plate. The case where microbubbles were not formed is indicated with "x", and the case where microbubbles were formed is indicated with "○".

(3) Durability: A polarizing plate prepared in the same manner as in (2) was cut into a size of 10 cm×8 cm. The cut polarized plate was adhered to a liquid crystal display or a glass plate, followed by pressing at 50° C. and 3.5 atm. The liquid crystal display or glass plate having the polarizing plate adhered was left at 85° C. for 250 hours as dry heat conditions, 60° C./90% RH for 250 hours as humidity-heat resistance conditions, and then 25° C. for 1 hour or more. The polarizing plate was observed to identify whether there was any detachment at one end of the polarizing plate or whether microbubbles occurred. Evaluation was conducted as follows:

◎: No detachment at one end of the polarizing plate and no occurrence of microbubbles ○: Slight detachment at one end of the polarizing plate and slight occurrence of microbubbles Δ: Slight detachment at one end of the polarizing plate and occurrence of lots of microbubbles X: Severe detachment at one end of the polarizing plate and occurrence of lots of microbubbles (4) Adhesive creep (μm): A polarizing plate prepared in the same manner as in (2) was cut into a size of 1.5 cm×12 cm. The cut polarized plate was adhered to a liquid crystal display or a glass plate, followed by pressing at 50° C. and 3.5 atm. The liquid crystal display or glass plate having the polarizing plate adhered thereto was left at 25° C. for 1 day to prepare specimens. The specimens were pulled using a Universal Test Machine (UTM) with a force of 2.25 kgf for 1,000 seconds and then the adhesive creep was measured according to pushed distance (μm) of the adhesive layer.

TABLE 2

|   | Examples |   |   |   |   |   | Comparative Example 1 |
|---|---|---|---|---|---|---|---|
|   | 1 | 2 | 3 | 4 | 5 | 6 |   |
| Minimum storage modulus ($10^3$ Pa) | 27.4 | 37.6 | 53.8 | 27.5 | 55.0 | 29.6 | 7.5 |
| Occurrence of microbubbles at high temperatures | X | X | X | X | X | X | ○ |
| Durability | ◎ | ◎ | ◎ | ◎ | ○ | ○ | X |
| Adhesive creep (μm) | 210 | 100 | 80 | 130 | 90 | 190 | 100 |

As shown in Table 2, the polarizing plate including the adhesive layer prepared from the adhesive for polarizing plates according to the embodiments exhibited no occurrence of microbubbles, even though it was left for a long period of time at high temperature, thereby exhibiting excellent durability.

By way of summation and review, films other than TAC films may be excellent in terms of cost or optical properties. However, films other than TAC films may have a low water vapor transmission rate (WVTR). In the case of attaching such films using an adhesive for a polarizing plate that is commonly used for TAC films, microbubbles may be generated in a final polarizing plate when leaving the polarizing plate at high temperatures, thereby causing a deterioration in durability.

The embodiments provide an adhesive for a polarizing plate, which adhesive inhibits generation of microbubbles upon attaching a specific protective film to a LCD panel and/or another protective film and facilitates formation of an adhesive layer with excellent durability.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An adhesive for adhering a protective film, the protective film having a water vapor transmission rate of about 100 g/m²·day or less at 40° C. and about 90% RH during manufacture of an optical member including a polarizing plate, the adhesive comprising:

a (meth)acrylic copolymer, the (meth)acrylic copolymer having a weight average molecular weight of about 800,000 g/mol or more;
a curing agent; and
a silane coupling agent,
wherein an adhesive layer prepared by curing the adhesive has a storage modulus of about $8 \times 10^3$ Pa or more, when measured at about 85° C. and at a frequency of about $10^{-3}$ rad/s to about $10^2$ rad/s.

2. The adhesive as claimed in claim 1, wherein the adhesive layer prepared by curing the adhesive has a storage modulus of about $27 \times 10^3$ Pa to about $2 \times 10^5$ Pa, when measured at about 85° C. and at a frequency of about $10^{-3}$ rad/s to about $10^2$ rad/s.

3. The adhesive as claimed in claim 1, wherein the (meth)acrylic copolymer has a weight average molecular weight of about 800,000 g/mol to about 1,800,000 g/mol.

4. The adhesive as claimed in claim 1, wherein the (meth)acrylic copolymer has a glass transition temperature of less than about −29° C.

5. The adhesive as claimed in claim 1, wherein the (meth)acrylic copolymer is a copolymer of a hydroxyl group-containing (meth)acrylic monomer, an alkyl group-containing (meth)acrylic monomer, and a carboxylic acid group-containing (meth)acrylic monomer.

6. The adhesive as claimed in claim 1, wherein the curing agent includes an isocyanate curing agent, a carbodiimide curing agent, an epoxy curing agent, an aziridine curing agent, a melamine curing agent, an amine curing agent, an imide curing agent, an amide curing agent, or mixtures thereof.

7. The adhesive as claimed in claim 1, wherein the curing agent includes a mixture of an isocyanate curing agent and a carbodiimide curing agent in a weight ratio of about 2:1 to 30:1.

8. The adhesive as claimed in claim 1, wherein the curing agent is present in the adhesive in an amount of about 0.5 parts by weight to about 5 parts by weight, based on 100 parts by weight of the (meth)acrylic copolymer.

9. The adhesive as claimed in claim 1, wherein the silane coupling agent includes an epoxy group.

10. The adhesive as claimed in claim 1, wherein the silane coupling agent is present in the adhesive in an amount of about 0.01 parts by weight to about 5 parts by weight, based on 100 parts by weight of the (meth)acrylic copolymer.

11. A polarizing plate comprising an adhesive layer prepared by curing the adhesive as claimed in claim 1.

12. The polarizing plate as claimed in claim 11, further comprising a protective film on the adhesive layer, the protective film having a water vapor transmission rate of about 100 g/m²·day or less at 40° C. and about 90% RH.

13. The polarizing plate as claimed in claim 12, wherein the protective film includes a cyclic polyolefin, polycarbonate, polyester, polyethersulfone, polysulfone, polyamide, polyimide, polyolefin, polyarylate, polyvinyl alcohol, polyvinyl chloride, polyvinylidene chloride films, or mixtures thereof.

14. The polarizing plate as claimed in claim 11, wherein the polarizing plate includes:
a polarizer;
a first protective film stacked on an upper side of the polarizer; and
a second protective film stacked on a lower side of the polarizer, the second protective film:
having a water vapor transmission rate of about 100 g/m²·day or less at about 40° C. and about 90% RH, and
being between the adhesive layer and the polarizer.

15. The polarizing plate as claimed in claim 11, wherein the polarizing plate includes:
a polarizer;
a first protective film stacked on an upper side of the polarizer;
a second protective film stacked on a lower side of the polarizer; and
a third protective film stacked on a lower side of the second protective film,
wherein:
at least one of the second protective film and the third protective film has a water vapor transmission rate of about 100 g/m²·day or less at about 40° C. and about 90% RH, and
the adhesive layer includes a first adhesive layer and a second adhesive layer, the first adhesive layer being between the second protective film and the third protective film and the third protective film being between the second adhesive layer and the first adhesive layer.

16. An optical member comprising the polarizing plate as claimed in claim 11.

* * * * *